(12) United States Patent
Nozaki et al.

(10) Patent No.: US 10,661,648 B2
(45) Date of Patent: May 26, 2020

(54) RUBBER STOPPER

(71) Applicant: SUMITOMO RIKO COMPANY LIMITED, Komaki-shi, Aichi (JP)

(72) Inventors: Junichi Nozaki, Komaki (JP); Motohiro Kawai, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 18 days.

(21) Appl. No.: 16/198,993

(22) Filed: Nov. 23, 2018

(65) Prior Publication Data
US 2019/0291561 A1   Sep. 26, 2019

(30) Foreign Application Priority Data

Mar. 26, 2018   (JP) ................................. 2018-058138

(51) Int. Cl.
*B60K 5/12*      (2006.01)
*F16F 15/08*     (2006.01)

(52) U.S. Cl.
CPC ............ *B60K 5/1208* (2013.01); *F16F 15/08* (2013.01); *B60G 2204/41043* (2013.01)

(58) Field of Classification Search
CPC .................. F16F 15/08; B60K 5/1208; B60G 2204/41043; F16B 21/084
USPC ..................................... 267/140, 140.11, 141
See application file for complete search history.

(56) References Cited

U.S. PATENT DOCUMENTS

| | | | | |
|---|---|---|---|---|
| 4,936,530 | A * | 6/1990 | Wollar | F16B 2/12 248/68.1 |
| 5,909,991 | A * | 6/1999 | Manion | F16B 21/084 411/377 |
| 6,644,218 | B2 * | 11/2003 | Gruber | F16F 1/428 108/57.12 |
| 7,096,798 | B2 * | 8/2006 | Gruber | F16F 1/428 108/57.12 |
| 8,790,058 | B2 * | 7/2014 | Quaderer | F16B 19/004 411/510 |
| 9,212,676 | B2 * | 12/2015 | Selle | F16B 12/20 |
| 9,657,807 | B2 * | 5/2017 | Morris | F16B 5/0628 |
| 10,119,593 | B2 * | 11/2018 | Kojima | F16F 15/08 |
| 2015/0252871 | A1 * | 9/2015 | Kondo | F16F 1/36 267/141 |
| 2015/0345583 | A1 * | 12/2015 | Ishikawa | F16F 3/0873 248/634 |

(Continued)

FOREIGN PATENT DOCUMENTS

JP         H11-173370 A        6/1999

*Primary Examiner* — Thomas W Irvin
(74) *Attorney, Agent, or Firm* — Oliff PLC

(57) ABSTRACT

A rubber stopper configured to be mounted onto a stopper part of a vibration damping device having a mounting hole, including: a stopper main body to be overlapped on the stopper part; and at least one mounting leg projecting from the stopper main body to be inserted into the mounting hole of the stopper part. The mounting leg includes a neck to be positioned within the mounting hole, a protrusion to pass through the mounting hole and be positioned on a back surface side of the stopper part, and a detent positioned between the neck and the protrusion to be detained with the back surface of the stopper part. The detent includes at least one notched part where an outside diameter of the detent is made small, the notched part being provided partially in a circumferential direction of the detent.

9 Claims, 7 Drawing Sheets

(56) References Cited

U.S. PATENT DOCUMENTS

2016/0116018 A1* 4/2016 Yoshii .................... F16F 1/371
267/141

* cited by examiner

RUBBER STOPPER

INCORPORATED BY REFERENCE

The disclosure of Japanese Patent Application No. 2018-058138 filed on Mar. 26, 2018 including the specification, drawings and abstract is incorporated herein by reference in its entirety.

BACKGROUND OF THE INVENTION

1. Field of the Invention

The present invention relates to a rubber stopper that is a separate component from a vibration damping device and is adapted to be mounted onto a stopper part that limits an amount of deformation of the vibration damping device.

2. Description of the Related Art

Conventionally, there are known as a vibration damping device, for example, an engine mount for supporting a power unit in a vibration damping manner, a body mount for supporting an automotive body in a vibration damping manner, a member mount for connecting a suspension component that constitutes a suspension mechanism to a vehicle main body in a vibration damping manner, or the like. Such a vibration damping device sometimes adopts a stopper mechanism with the aim of limiting an amount of deformation of a rubber mount or the like that constitutes the vibration damping device so as to limit an amount of relative displacement of a target for the vibration damping connection, or the like.

In general, the stopper mechanism can be realized by the components that undergo relative displacement during vibration input coming into abutment against each other in cushioned fashion via a cushioning rubber. Here, for the rubber mount or the like that constitutes the vibration damping device, it could indeed be possible to integrally provide the stopper mechanism to the vibration damping device itself by integrally molding the mount rubber and the cushioning rubber. However, in the case in which the stopper mechanism is integrally provided to the vibration damping device, the direction of deformation of the vibration damping device on which the stopper mechanism acts may be limited, as well as it may be difficult to realize the desired stopper function due to a limitation on a material, shape, size or the like of the cushioning rubber.

Thus, there is suggested a stopper mechanism including a stopper part that undergoes relative displacement during vibration input and limits the amount of deformation of the vibration damping device through abutment, and a rubber stopper disposed to a portion to be abutted by the stopper part, the rubber stopper being a separate component from the vibration damping device. For example, Japanese Unexamined Patent Publication No. JP-A-H11-173370 discloses such a stopper mechanism.

In the case of adopting the rubber stopper that is a separate component from the vibration damping device in this way, when the rubber stopper is overlapped and mounted onto the stopper part provided to a bracket or the like, a simpler fixing method than vulcanization bonding or the like will be required.

To meet such a requirement, JP-A-H11-173370 proposes a fixing structure in which a rubber stopper having a sheet form is integrally provided with a fixing projection including a conical barb part, and the fixing projection is inserted into a mounting hole provided to the stopper part, then the barb part is detained with the back surface of the stopper part so as to be fixed under a latched condition.

Meanwhile, during input of a large load to the vibration damping device, the stopper rubber may be subjected to not only an external force in the direction of compression but also a large force in the direction along the overlapped face on the stopper part or the like. This requires the stopper rubber to have a sufficient fastening force with respect to the stopper part. On the other hand, for the conventional fixing structure of the rubber stopper using the fixing projection described in JP-A-H11-173370, in order to increase the fastening force with respect to the stopper part, it is conceivable to enlarge the outside diameter of the conical barb part so as to increase the width of detainment to the stopper part.

However, with the stopper rubber, if the outside diameter of the barb part is enlarged in order to improve the fastening force to the stopper part, as a trade-off, it may be difficult to insert the barb part into the mounting hole of the stopper part, thereby posing a problem of deterioration in assembly workability of the stopper part and hence productivity during production.

SUMMARY OF THE INVENTION

It is therefore one object of this invention to provide a novel technology for a rubber stopper that is a separate component from a vibration damping device and to be mounted onto a stopper part, which is able to achieve improvement in fastening force to the stopper part and good assembly workability with respect to the stopper part in a compatible manner.

The above and/or optional objects of this invention may be attained according to at least one of the following preferred embodiments of the invention. The following preferred embodiments and/or elements employed in each preferred embodiment of the invention may be adopted at any possible optional combinations.

The first preferred embodiment of the present invention provides a rubber stopper configured to be mounted onto a stopper part of a vibration damping device, the stopper part being adapted to limit an amount of deformation of the vibration damping device and having a mounting hole, the rubber stopper comprising: a stopper main body to be overlapped on an abutting face of the stopper part; and at least one mounting leg projecting from the stopper main body to a side of the abutting face of the stopper part, the mounting leg being configured to be inserted into the mounting hole of the stopper part, wherein the mounting leg includes a neck to be positioned within the mounting hole, a protrusion to pass through the mounting hole and project to be positioned on a side of a back surface of the stopper part, and a detent positioned between the neck and the protrusion, the detent having an outer peripheral surface enlarged from the protrusion toward the neck and being configured to be detained with the back surface of the stopper part, and the detent includes at least one notched part where an outside diameter of the detent is made small, the notched part being provided partially in a circumferential direction of the detent.

According to the rubber stopper structured following the present preferred embodiment, the detent detained with the back surface of the stopper part may be readily allowed to undergo elastic deformation in the direction of diameter constriction owing to the notched part. Therefore, while favorably maintaining operation efficiency in attaching the rubber stopper to the stopper part by inserting the mounting leg including the detent into the mounting hole of the stopper part, it is possible to sufficiently obtain fastening force of the rubber stopper to the stopper part by enlarging the outside diameter of the detent to increase the width dimension of detainment in the diametrical direction with respect to the back surface of the stopper part.

A second preferred embodiment of the present invention provides the rubber stopper according to the first preferred embodiment, wherein a diameter dimension of a bottom part of the notched part of the detent is not smaller than a diameter dimension of the neck.

According to the rubber stopper structured following the present preferred embodiment, it is avoided that the diameter dimension of the mounting leg is locally reduced due to the notched part. Therefore, for example, during assembly, namely, when the mounting leg is inserted into the mounting hole, or when a pulling force acts on the mounting leg due to the action of the stopper load, concentration of localized stress and strain on the formation portion of the notched part is also prevented, thereby realizing excellent durability and load bearing capability.

A third preferred embodiment of the present invention provides the rubber stopper according to the first or second preferred embodiment, wherein in a lengthwise direction of the mounting leg, the notched part of the detent extends from a neck-side end face of the detent in the lengthwise direction of the mounting leg, and the notched part has a length that does not reach the protrusion.

According to the rubber stopper structured following the present preferred embodiment, the notched part is provided on the large-diameter side (neck side) of the detent which is configured to be greatly deformed when the mounting leg is inserted into the mounting hole, which makes deformation easy. This makes it even easier to mount the rubber stopper on the stopper part. On the other hand, since the notched part is not provided at the distal end of the small-diameter side (protrusion side) of the detent, strength and durability of the detent are not excessively reduced.

A fourth preferred embodiment of the present invention provides the rubber stopper according to any of the first through third preferred embodiments, wherein the notched part of the detent has a groove shape extending in a lengthwise direction of the mounting leg with a cross sectional shape expanding toward the outer peripheral surface of the detent.

According to the rubber stopper structured following the present preferred embodiment, the notched part is formed in an expanded shape toward the outer peripheral side of the detent where the deformation amount becomes large when the mounting leg is inserted into the mounting hole. Thus, deformation of the detent at the time of attachment to the stopper part is more easily permitted, and workability can be further improved. The groove-shaped notched part may be inclined with respect to the axial direction of the mounting leg or the like, the cross sectional shape thereof may be changed in the length direction of the mounting leg, and the notched part may be provided partially or intermittently.

A fifth preferred embodiment of the present invention provides the rubber stopper according to any of the first through fourth preferred embodiments, wherein the notched part of the detent is provided such that the notched part is positioned on at least one of opposite sides in a direction orthogonal to a direction in which a main load acts in a planar direction of the stopper main body.

According to the rubber stopper structured following the present preferred embodiment, it is possible to provide the notched part of the detent at a position where a heavy load is less likely to be exerted. This makes it possible to more efficiently prevent the rubber stopper from detachment from the stopper part due to accidental dislodgment of the mounting leg from the mounting hole, while improving assembly workability to the stopper part.

A sixth preferred embodiment of the present invention provides the rubber stopper according to the fifth preferred embodiment, wherein the at least one notched part of the detent comprises a pair of notched parts, and the notched parts are positioned on the opposite sides in the direction orthogonal to the direction in which the main load acts in the planar direction of the stopper main body.

A seventh preferred embodiment of the present invention provides the rubber stopper according to any of the first through fifth preferred embodiments, wherein the at least one mounting leg comprises a pair of mounting legs that are positioned and opposed to each other on opposite sides in a direction in which a main load acts in a planar direction of the stopper main body, and the detent of each mounting leg includes the notched part having a prescribed circumferential width on a corresponding one of inner sides of the mounting legs that are opposed to each other.

According to the rubber stopper structured following the present preferred embodiment, the stopper main body can be efficiently positioned and held by the pair of mounting legs against the load applied, and it is possible to provide the notched part to the detent of each mounting leg at a position where the heavy load is less likely to be exerted. This makes it possible to effectively realize excellent fastening force to the stopper part and good assembly workability in a compatible manner.

An eighth preferred embodiment of the present invention provides the rubber stopper according to any of the first through seventh preferred embodiments, wherein the mounting leg is situated away from a position where the stopper main body is configured to be abutted by the vibration damping device.

According to the rubber stopper structured following the present preferred embodiment, direct or intensive action of the stopper load and accompanying large deformation are avoided in the boundary part with the mounting leg and the mounting leg itself. As a result, it is possible to realize a stable fixed state to the stopper part by the mounting leg.

A ninth preferred embodiment of the present invention provides the rubber stopper according to any of the first through eighth preferred embodiments, wherein the stopper main body includes a plurality of recessed grooves on a surface thereof, the recessed grooves extending in a direction orthogonal to a direction in which a main load acts in a planar direction of the stopper main body.

According to the rubber stopper structured following the present preferred embodiment, the substantial free surface area in the stopper main body is increased to improve the stopper cushioning performance. In addition, in the direction in which a main load acts in the planar direction of the stopper main body, the external force transmitted to the mounting leg from the portion where the load is input can be efficiently reduced by the deforming action of the recessed grooves provided on the surface of the stopper main body, thereby improving stability and reliability of the fixed state to the stopper part by the mounting leg.

According to the present invention, with a rubber stopper which is a separate component from the vibration damping device and is attached to be mounted onto the stopper part afterwards, it is possible to improve the fastening force to the stopper part and to achieve good assembly workability with respect to the stopper part in a compatible manner.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Practical embodiments of the present invention will be described below in reference to the drawings.

Figure 1:
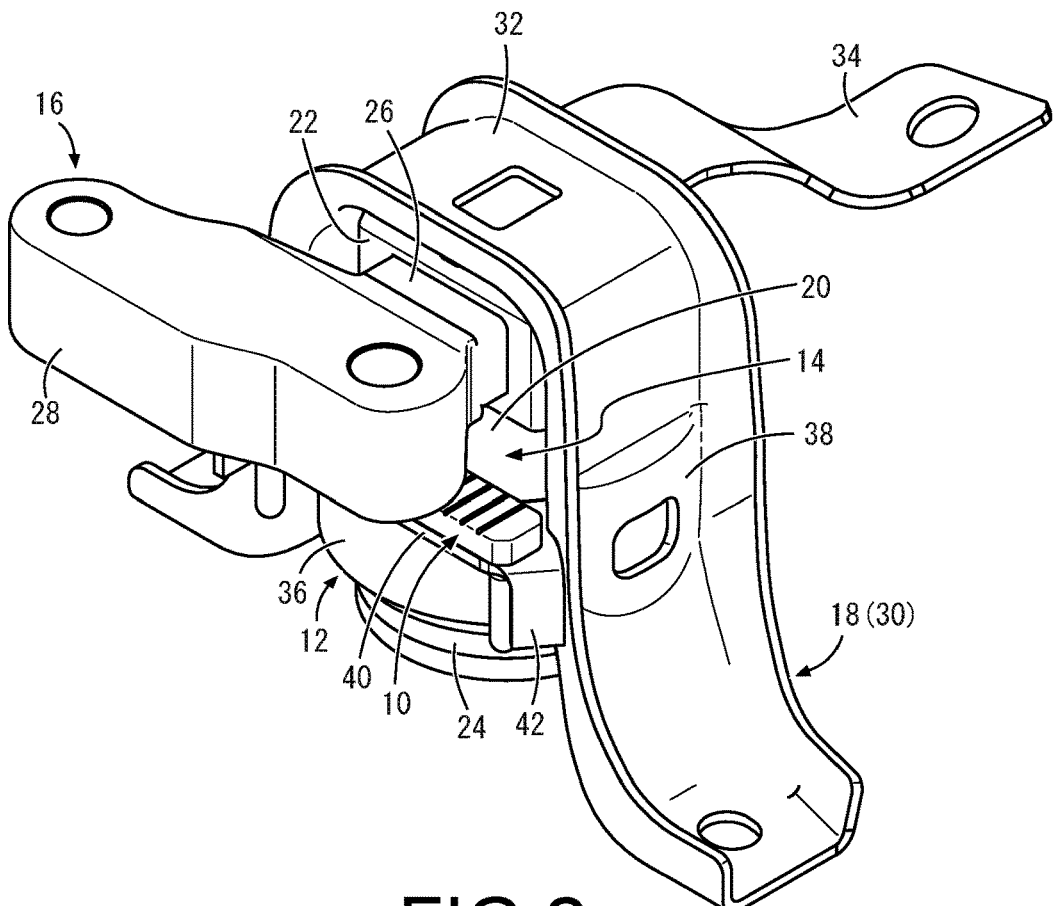
FIG. 1 is a perspective view showing a rubber stopper according to a first practical embodiment of the present invention in a state of being mounted onto a vibration damping device.
Figure 2:
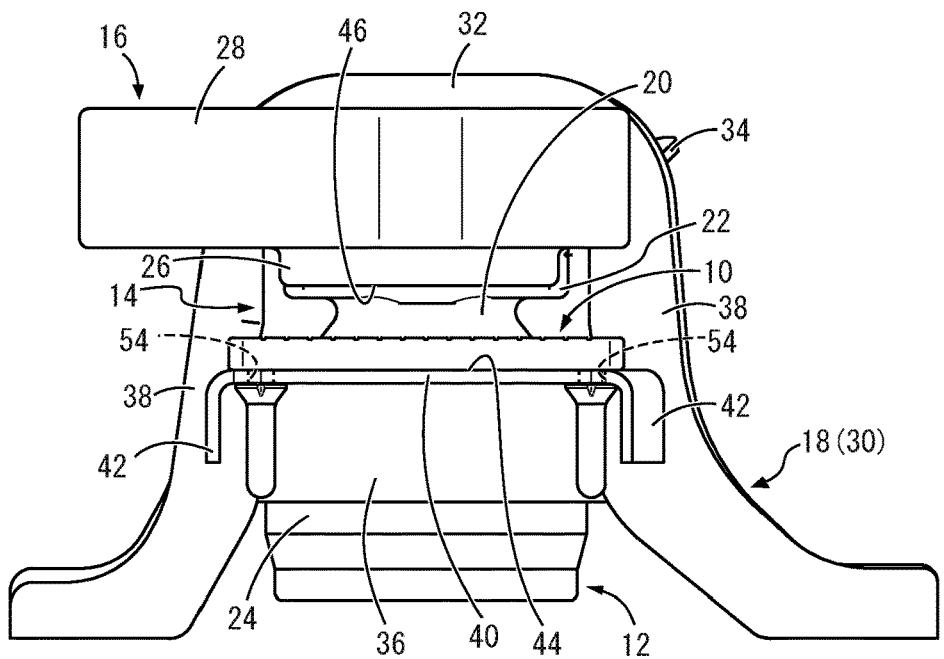
FIG. 2 is a front elevational view of the rubber stopper shown in FIG. 1 in the state of being mounted onto the vibration damping device.
Figure 3:
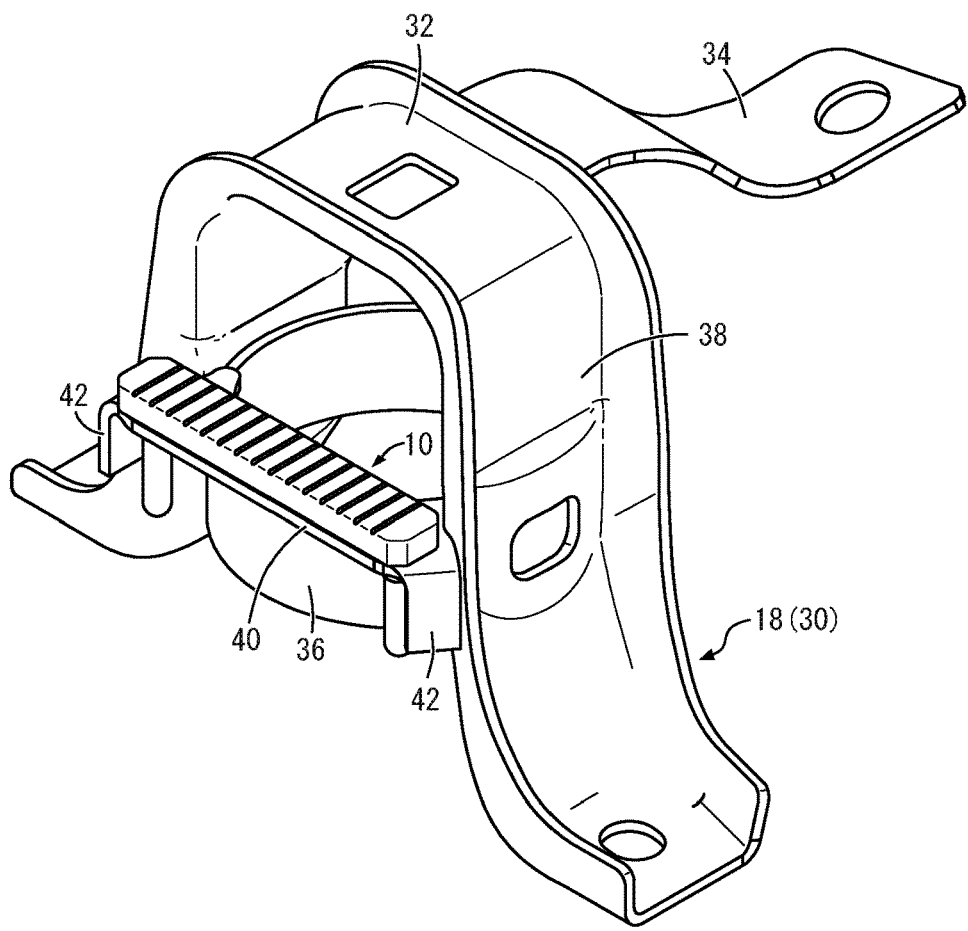
FIG. 3 is a perspective view of the rubber stopper shown in FIG. 1 in the state of being mounted onto a bracket of the vibration damping device.

FIGS. 1 and 2 depict a rubber stopper 10 according to a first practical embodiment of the present invention in a state of being mounted onto a vibration damping device 12. In the present practical embodiment, an engine mount which supports a power unit in a vibration damping manner with respect to a vehicle body in an automobile comprises the vibration damping device 12. Such vibration damping device 12 includes a stopper mechanism 14 for limiting an amount of elastic deformation of the vibration damping device 12 in cushioned fashion when the power unit is relatively displaced vertically downward with respect to the vehicle body. The stopper mechanism 14 is constituted by abutting parts provided between the first bracket 16 to be attached to the power unit side and the second bracket 18 to be attached to the vehicle body side so as to be opposed to each other at a prescribed distance in the vertical direction. The rubber stopper 10 is mounted onto one abutting face of the abutting parts, so that the impact during the abutment of the abutting part of the stopper mechanism 14 is configured to be cushioned by the rubber stopper 10. In the following description, as a general rule, the vertical direction refers to the vertical direction in FIG. 2, which approximately coincides with the vertical direction in a state of being mounted onto the vehicle.

Described more specifically, first, the vibration damping device 12 to which the rubber stopper 10 is mounted in the present practical embodiment will be briefly described. That is, the vibration damping device 12 to which the rubber stopper 10 is mounted is not particularly limited, but in the present practical embodiment, a so-called bowl-shaped rubber mount is adopted. Specifically, the rubber mount includes a main rubber elastic body 20 of generally frusto-conical shape, and a first mounting member 22 is bonded to the small-diameter side end located on the upper side in the central axis direction thereof, while a second mounting member 24 is bonded to the large-diameter side end located on the lower side in the central axis direction.

In particular, in the present practical embodiment, the first mounting member 22 is formed of a rigid material having a generally rectangular frame shape made of metal or the like, and its center hole is opened in the horizontal direction. The first mounting member 22 is bonded so as to be overlapped on the small-diameter end face of the main rubber elastic body 20. The second mounting member 24 is formed of a rigid material having a generally round tubular shape or a bottomed round tubular shape made of metal or the like, and its center hole is oriented in the vertical direction. The second mounting member 24 is bonded so as to be overlapped on the outer peripheral surface of the large-diameter side end of the main rubber elastic body 20. With this arrangement, the vibration damping device 12 has a structure in which the main rubber elastic body 20 elastically connects the first mounting member 22 and the second mounting member 24 arranged so as to be remote from each other in the vertical direction, which is the direction of input of the static support load of the power unit.

Furthermore, the first bracket 16 made of a rigid material such as metal is bonded to the first mounting member 22. The first bracket 16 includes a press-fit part 26 of generally rectangular block shape and a fixing part 28 that is integrally formed with the proximal end side of the press-fit part 26 and has bolt holes for being fixed to the power unit side. The first bracket 16 is bonded by being press-fitted into the center hole of the first mounting member 22 from the distal end side of the press-fit part 26, and the fixing part 28 is positioned so as to project outward from the first mounting member 22.

Besides, the second bracket 18 is bonded to the second mounting member 24. The second bracket 18 is formed by a press-mold metal or the like, and includes a generally gate-shaped main body part 30 and a plate-shaped bracing part 34 bonded to the main body part 30 by welding or the like so as to extend backward from a top plate part 32. In the gate-shaped inner space of the main body part 30, a mounting part 36 of large-diameter, round tubular shape is bonded by welding or the like. The mounting part 36 is arranged such that, with its center axis directed to the vertical direction, the portions of the circumferential wall that are opposed in one diametrical direction are boned by welding or the like to respective opposite leg parts 38, 38 constituting the main body part 30, at the medial portions of the opposite leg parts 38, 38 in the height direction. By the second mounting member 24 being bonded to the mounting part 36 by press-fitting or the like, the vibration damping device 12 is disposed coaxially with the mounting part 36 with the mount center axis directed to the vertical direction, so as to be fixedly mounted onto the second bracket 18.

The vibration damping device 12 constructed in the above manner is mounted with the mount center axis roughly coinciding with the vertical direction, by the first mounting member 22 being fixed to the power unit side of the automobile via the first bracket 16, and by the second mounting member 24 being fixed to the body side of the automobile via the second bracket 18. Under such a mounted state, the static distributed load of the power unit is exerted roughly in the mount center axis direction, and in cooperation with the other engine mounts, the vibration damping device 12 constitutes a vibration damping support system of the power unit with respect to the vehicle body. In the mounted state, due to exertion of the static distributed load of the power unit, the main rubber elastic body 20 of the vibration damping device 12 is elastically deformed, so that the first mounting member 22 and the second mounting member 24 are positioned by being relatively displaced in the direction of approach.

Meanwhile, the second bracket 18 is provided with a stopper part 40 which is located on the upper opening side of the mounting part 36 and extends on the outer peripheral portion of the mounting part 36. The stopper part 40 is formed of a rigid material such as a metal plate, and has a flat-plate shape extending in the horizontal direction roughly perpendicular to the mount center axis of the vibration damping device 12. The stopper part 40 is disposed so as to straddle the left and right opposite leg parts 38, 38 on one opening side in the front-back direction of the generally gate-shaped main body part 30 of the second bracket 18.

Figure 4:
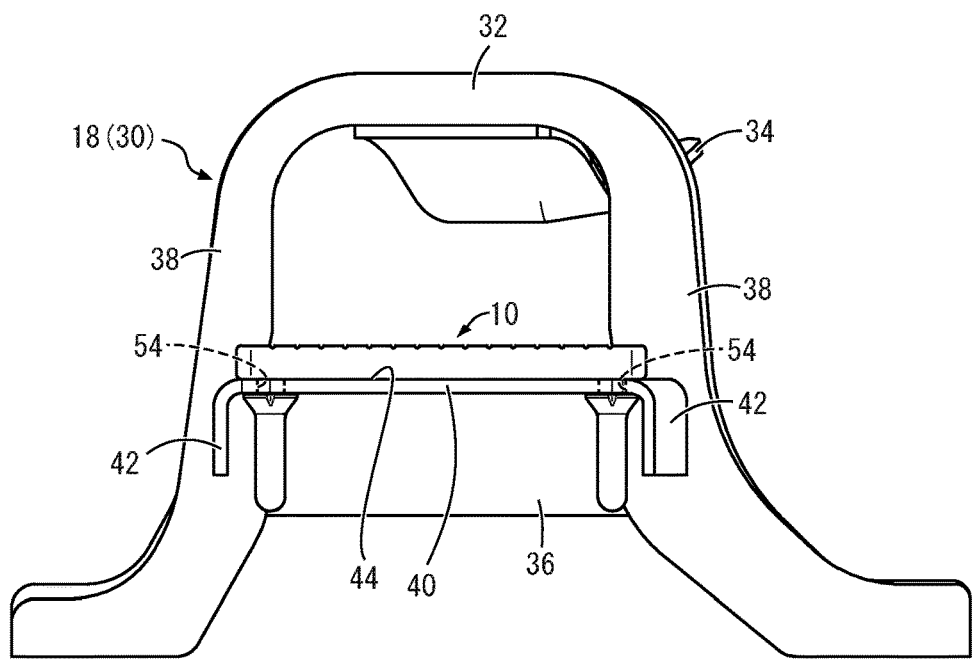
FIG. 4 is a front elevational view of the rubber stopper shown in FIG. 3 in the state of being mounted onto the bracket of the vibration damping device.
Figure 5:
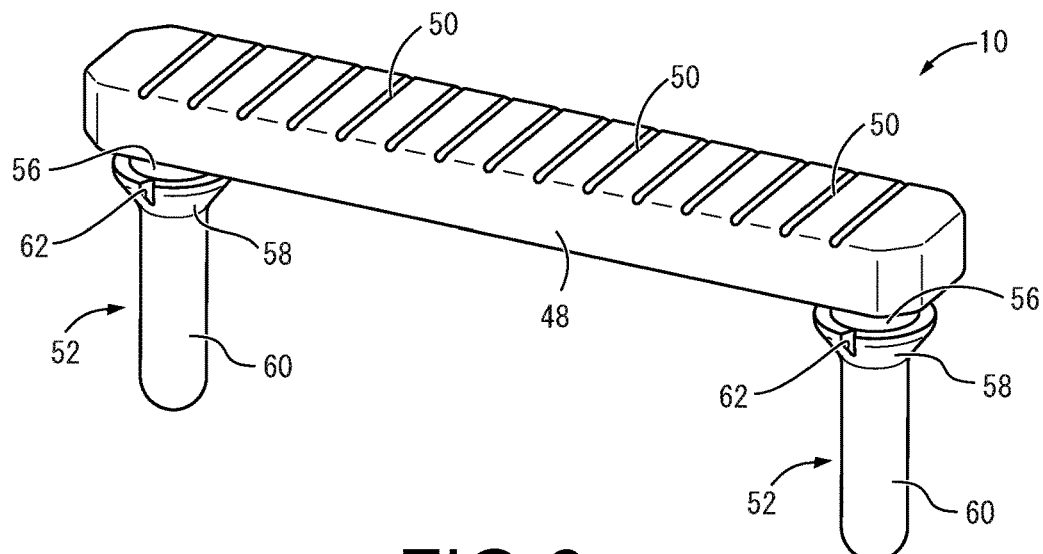
FIG. 5 is a perspective view of the rubber stopper shown in FIG. 1 in isolation.

It is acceptable as long as the stopper part 40 has a roughly flat rigid surface on the upper face constituting the abutting face of the stopper mechanism 14, and the specific shape and structure are not limited. In the present practical embodiment, the stopper part 40 has a roughly flat-plate shape, and is overlapped on and supported by the upper end face of the mounting part 36 of the second bracket 18. Besides, the stopper part 40 includes ribs 42, 42 integrally formed with its opposite portions in the lengthwise direction, which is the left-right direction in FIGS. 2 and 4, and extending downward. The ribs 42, 42 are bonded to the respective opposite leg parts 38, 38 of the second bracket 18, thereby improving reinforcement and support strength with respect to the stopper part 40.

Above the stopper part 40 provided to the second bracket 18, there is positioned the proximal end portion of the press-fit part 26 projecting from the first mounting member 22 of the first bracket 16 to the lateral side. Accordingly, a horizontal upper face 44 of the stopper part 40 is opposed to a horizontal lower face 46 of the press-fit part 26 with a prescribed distance in the vertical direction.

The distance between the opposed faces 44, 46 of the stopper part 40 and the first bracket 16 (fixing part 28) is changed by elastic deformation of the main rubber elastic body 20 of the vibration damping device 12 due to a vibration load exerted with the device mounted onto the automobile. Then, for example, during input of a large impact load is input in the vertical direction when the automobile drives over a bump or the like, the opposed faces of the stopper part 40 and the first bracket 16 (fixing part 28) strike each other. This will limit the amount of elastic deformation of the main rubber elastic body 20 and hence the amount of relative displacement of the power unit with respect to the vehicle body in the vertical direction, thereby exhibiting the stopper function.

Here, the rubber stopper 10 is disposed on the abutting face of the stopper part 40 and the first bracket 16 (fixing part 28) with the aim of preventing the opposed faces 44, 46 of the stopper part 40 and the first bracket 16 (fixing part 28) from abutting sharply against each other so as to reduce occurrence of impact, noise, and vibration during the stopper action.

The opposed face (abutting face) 46 (lower face 46) of the first bracket 16 has a left-right lengthwise dimension that is smaller than that of the opposed face (abutting face) 44 (upper face 44) of the stopper part 40 constituting the stopper mechanism 14. Thus, during relative displacement of the stopper part 40 and the first bracket 16 in the vertical direction, the opposed face 46 of the first bracket 16 abuts against only the lengthwise center portion of the opposed face 44 of the stopper part 40. However, in the vehicle running state, during input of a large load in the vertical direction, loads in the vehicle front-back direction due to acceleration and deceleration of the vehicle or the like are sometimes input in the left-right direction in FIG. 2 concomitantly. Even in such a situation, the opposed face 46 of the first bracket 16 deviates to and abuts against either one side from the lengthwise center of the opposed face 44 of the stopper part 40, thereby exhibiting the stopper function.

As shown in detail in FIGS. 5 to 11, the rubber stopper 10 of the present practical embodiment is provided with a stopper main body 48 of generally flat-plate shape or block shape having a predetermined thickness. The stopper main body 48 has such a shape and size as to be able to cover the upper face 44 of the stopper part 40 roughly entirely with a constant thickness. The material and the thickness dimension of the rubber stopper 10 can be appropriately set in consideration of the required cushioning characteristics and the durability under usage environment conditions and the like.

On the upper surface of the stopper main body 48, recessed grooves 50 extending in a width direction, which is a direction orthogonal to the left-right lengthwise direction (vertical direction in FIG. 7), are provided in plurality at a predetermined distance in the lengthwise direction of the stopper main body 48.

Further, the rubber stopper 10 integrally includes mounting legs 52 that are located on opposite portions in the left-right lengthwise direction of the stopper main body 48 and project downward, which is the back surface side. The mounting legs 52, 52 are inserted through mounting holes 54 formed in the corresponding locations of the stopper part 40, so that the rubber stopper 10 is fixedly attached to the stopper part 40 with the fixing action due to detainment of the mounting legs 52, 52 with respect to the stopper part 40.

That is, each of the mounting legs 52 has a solid, generally rod shape overall projecting downward roughly perpendicularly from the flat back surface of the stopper main body 48. As described above, in the stopper mechanism 14 of the present practical embodiment, in addition to load input in the vertical direction of the vehicle, a load may be input in the left-right direction in FIG. 2, which is the vehicle front-back direction as well. Thus, the direction in which a main load acts in the planar direction of the stopper main body 48 coincides with the lengthwise direction, which is the left-right direction in FIG. 2. The pair of mounting legs 52, 52 are provided in a state of being opposed to each other in the lengthwise direction of the stopper main body 48. Particularly in the present practical embodiment, the pair of mounting legs 52, 52 are situated away from the position where the stopper main body 48 is configured to be abutted by the opposed face 46 of the first bracket 16, outward to the opposite sides in the lengthwise direction.

In addition, the mounting leg 52 includes a neck 56, a detent 58, and a protrusion 60 which are integrally formed sequentially from its proximal end side close to the stopper main body 48 toward its lower, protruding distal end side in the lengthwise direction (axial direction), and have mutually different shapes and/or functions.

Figure 6:
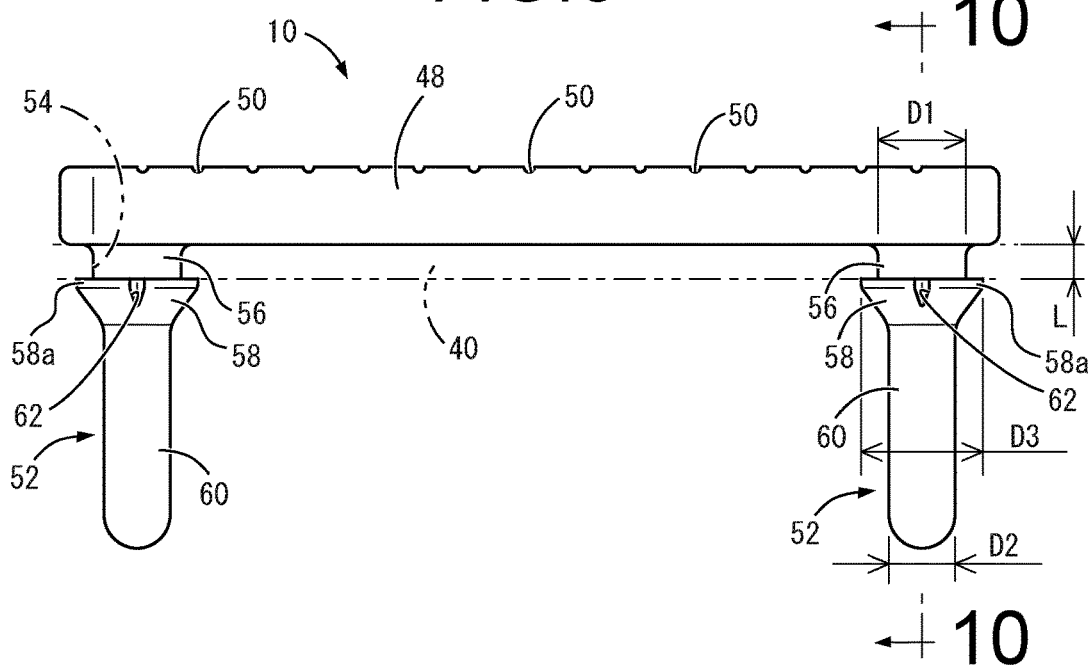
FIG. 6 is a front view of the rubber stopper shown in FIG. 5.
Figure 7:
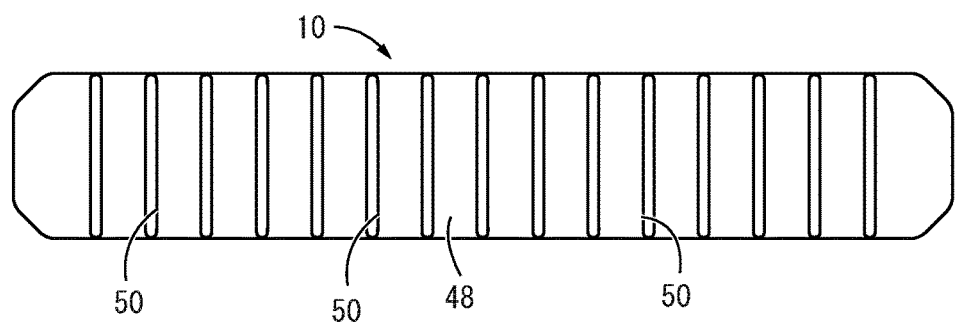
FIG. 7 is a top plan view of the rubber stopper shown in FIG. 5.
Figure 8:
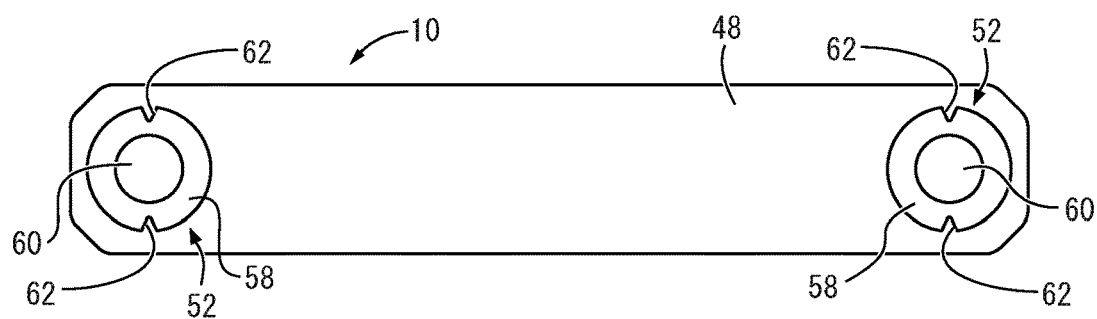
FIG. 8 is a bottom plan view of the rubber stopper shown in FIG. 5.
Figure 9:
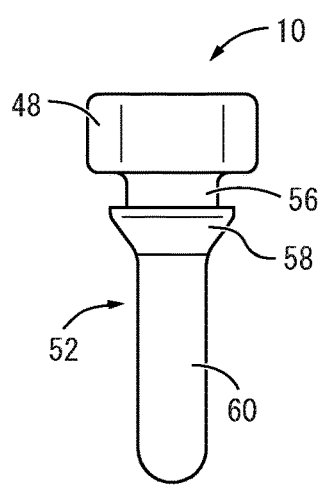
FIG. 9 is a side view of the rubber stopper shown in FIG. 5.

As the stopper part 40 is shown in FIG. 6 by the imaginary line, the protrusion 60 of the mounting leg 52 is inserted into the upper opening of the mounting hole 54 of the stopper part 40 from the protruding distal end side. Then, the protrusion 60 protruding below the stopper part 40 is grasped by fingers, a machine or the like and pulled downward. By so doing, the protrusion 60 and the detent 58 of the mounting leg 52 pass through the mounting hole 54 and are pulled out to be positioned below the stopper part 40. Besides, the neck 56 is drawn into and positioned inside the mounting hole 54. In this state, the upper end of the detent 58 is caught by and detained with the lower opening peripheral edge of the mounting hole 54 at the back surface of the stopper part 40, whereby the mounting leg 52 is prevented from being dislodged upward from the mounting hole 54. Accordingly, the back surface of the stopper main body 48 is held overlapped roughly in intimate contact with the upper face 44 of the stopper part 40.

Here, the neck 56 of the mounting leg 52 has a short pillar shape and extends downward in the axial direction, and in the present practical embodiment, the neck 56 extends with a constant circular cross section. It is desirable that the outside diameter D1 of the neck 56 be set approximately equal to or smaller than the inside diameter of the mounting hole 54, and the axial length L of the neck 56 be set approximately equal to the thickness dimension of the stopper part 40, namely, the length dimension of the mounting hole 54. In consideration of compatibility between the insertion workability of the mounting leg 52 and the detaining action of the detent 58, the mounting hole 54 of the stopper part 40 may have a smaller diameter at the lower opening than at the upper opening. Also, in consideration of the shape of the fillet at the upper end periphery of the neck 56, the corner of the upper end opening edge of the mounting hole 54 may be chamfered.

Although the stopper part 40 provided with the mounting hole 54 is a rigid material, the neck 56 is a rubber elastic body, and the neck 56 is stretched in the axial direction and inserted into the mounting hole 54. Thus, even if the neck 56 is somewhat thicker or shorter than the mounting hole 54, it is possible to insert the neck 56 into the mounting hole 54. Furthermore, by making the thickness of the neck 56 equal to or slightly thicker than the mounting hole 54, it is possible to avoid the gap generation within the mounting hole 54 in the mounted state. Besides, by making the length of the neck 56 equal to or slightly shorter than the mounting hole 54, it is possible to press the upper end of the detent 58 against the back surface of the stopper part 40 so as to provide intimate abutment in the mounted state.

On the other hand, in order to facilitate insertion of the protrusion 60 into the mounting hole 54 of the stopper part 40, the protrusion 60 of the mounting leg 52 has a rod shape with an outside diameter dimension D2 smaller than the inside diameter of the mounting hole 54 and extends roughly in the vertical direction. While the protrusion 60 of the present practical embodiment has a generally constant cross-sectional shape across the entire length in order to avoid localized stress concentration at the time of pulling operation, only the distal end of the protrusion 60 has a tapered shape in order to facilitate the insertion operation into the mounting hole 54. However, since the protrusion 60 is unnecessary after attachment, it is also possible to cut the protrusion 60 after attachment. Thus, in consideration of cutting workability, it would also be acceptable to provide a planned cutting line comprising a small cross-sectional part locally in the lengthwise direction.

In the present practical embodiment, the outside diameter D1 of the neck 56 of the mounting leg 52 is set equal to the inside diameter of the mounting hole 54, while the outside diameter D2 of the protrusion 60 is set smaller than the inside diameter of the mounting hole 54. Accordingly, the outside diameter D2 of the protrusion 60 is smaller than the outside diameter D1 of the neck 56 by a predetermined dimension.

The detent 58 provided between the axially opposite neck 56 and protrusion 60 of the mounting leg 52 has a generally inverted frustoconical shape being enlarged in diameter upward by its outside diameter dimension changing in the central axis direction. In the present practical embodiment, the outside diameter of the small-diameter portion at the lower end of the detent 58 is roughly equal to the outside diameter D2 of the protrusion 60, while the outside diameter D3 of the large-diameter portion at the upper end of the detent 58 is larger than the outside diameter D1 of the neck 56 by a predetermined dimension.

That is, with the detent 58 of the present practical embodiment, the outside diameter of the small-diameter portion at the lower end is smaller than the inside diameter of the mounting hole 54 of the stopper part 40, while the outside diameter of the large-diameter portion at the upper end is larger than the inside diameter of the mounting hole 54. With this configuration, during mounting operation in which the detent 58 is inserted into the mounting hole 54, the detent 58 can be easily inserted from the small-diameter portion, while in the mounted state in which the detent 58 has passed through the mounting hole 54 to the back surface side of the stopper part 40, the large-diameter portion of the detent 58 is caught by the opening peripheral edge of the mounting hole 54 so as to be less prone to slip out upward.

In the present practical embodiment, at the large-diameter side end of the detent 58 having the inverted frustoconical shape, there is provided a tubular outer peripheral surface part 58a extending for a predetermined length in the axial direction with the maximum outside diameter D3. This may improve detaining force of the detent 58 with respect to the lower face of the stopper part 40.

Furthermore, a notched part 62 is provided so as to open onto the outer peripheral surface of the detent 58 of the mounting leg 52, so that the outside diameter dimension of the mounting leg 52 is made small there. The notched part 62 of the present practical embodiment has a V-shaped cross section which expands outward in the radial direction to both sides in the circumferential direction, and has a groove shape linearly extending downward from the upper end of the detent 58.

Figure 10:
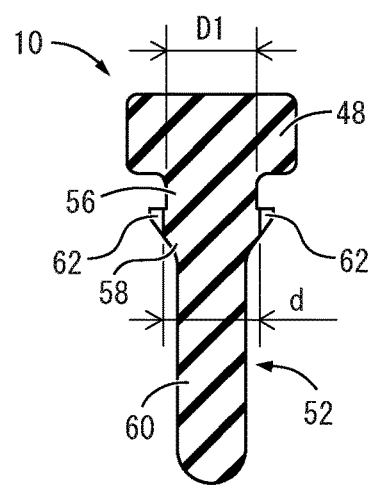
FIG. 10 is a cross sectional view taken along line 10-10 of FIG. 6.
Figure 11:
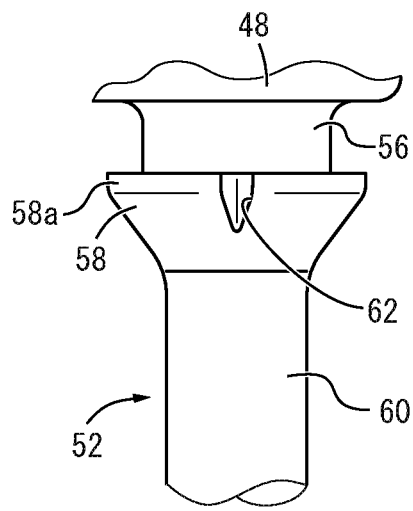
FIG. 11 is an enlarged view of a principal part of FIG. 6.

Besides, in the notched part 62, the diameter dimension of the bottom part which is deepest is made equal to or larger than the outside diameter dimension of the neck 56. In the present practical embodiment, the deepest position of the V-shaped cross section in the notched part 62 extends in the axial direction at a radial position that is equal to or larger than the outer peripheral surface of the neck 56 of the mounting leg 52. With this configuration, even if the notched part 62 is provided, the tensile strength and the durability of the detent 58 are prevented from lowering than those of the neck 56. In the present practical embodiment, as shown in FIG. 10, the diameter dimension d of the deepest position of the V-shaped cross section of the notched part 62 is slightly larger than the outside diameter dimension D1 of the neck 56 of the mounting leg 52.

Moreover, in the present practical embodiment, since the diameter dimension of the bottom part of the notched part 62 is generally constant across the entire length in the vertical direction, the height dimension of both side walls in the circumferential direction of the notched part 62 (depth dimension of the notched part 62) corresponds to the outside diameter dimension of the detent 58. Specifically, the notched part 62 extending downward from the upper end of the detent 58 is configured such that the depth dimension is maximized at the upper end of the detent 58, and the notched part 62 reaches the axially medial portion of the detent 58 where the outside diameter of the detent 58 gradually decreasing downward becomes equal to the outside diameter of the neck 56. Thus, the notched part 62 is not formed in the lower end portion of the detent 58, so that the notched part 62 does not reach the protrusion 60.

Furthermore, in the present practical embodiment, such notched part 62 is provided in pairs that are positioned in opposition to each other in one diametrical direction on the circumference of the detent 58. These notched parts 62, 62 are positioned on the opposite sides in the direction orthogonal to the left-right direction in FIG. 8, which is the direction in which the main load acts in the stopper main body 48. That is, in FIG. 8, the pair of notched parts 62, 62 provided to each mounting leg 52 are positioned on opposite sides in the vertical direction in FIG. 8.

With the rubber stopper 10 constructed in the above manner, ease of deformation of the detent 58 is improved by the notched part 62. In particular, since the notched part 62 is provided in the large-diameter portion of the detent 58, deformation in which the diameter of the large-diameter portion is reduced is easy. In the present practical embodiment in particular, since the notched part 62 has a groove shape extending in the axial direction with a generally V-shaped cross section gradually expanding to both sides in the circumferential direction toward the outer peripheral surface, the elastic deformation in which the detent 58 becomes smaller in diameter occurs more easily by the circumferential width of the notched part 62 becoming smaller.

Therefore, during inserting the mounting leg 52 into the mounting hole 54 of the stopper part 40 so as to mount the stopper main body 48 onto the vibration damping device 12, when the detent 58 passes through the mounting hole 54, the detent 58 can easily be reduced in diameter by the inner circumferential surface of the mounting hole 54. This makes it possible to easily attach the mounting leg 52, and hence the rubber stopper 10, to the stopper part 40.

On the other hand, the detaining force of the detent 58 against the lower opening peripheral edge of the mounting hole 54 of the stopper part 40, in other words, the resistance to dislodgment of the mounting leg 52 or the fastening force of the rubber stopper 10 with respect to the stopper part 40, will be exhibited due to deformation rigidity of the detent 58 in the axial direction by the upper end face of the detent 58 abutting against the lower surface of the stopper part 40.

Here, the notched part 62 provided to the detent 58 opens onto the outer peripheral surface of the detent 58, and does not open onto the axial end face of the detent 58. Thus, reduction of the deformation rigidity in the axial direction of the detent 58 due to the provision of the notched part 62 to the detent 58 is smaller than reduction of the deformation rigidity in the direction of diameter constriction of the detent 58. Therefore, it is possible to sufficiently obtain the resistance to dislodgment of the detent 58 from the mounting hole 54, namely, the fastening force of the rubber stopper 10 with respect to the stopper part 40.

Therefore, the rubber stopper 10 as described above is able to achieve improvement of the fastening force to the stopper part 40 and good assembly workability with respect to the stopper part 40 in a compatible manner.

Under the mounted state of the rubber stopper 10 on the automotive vehicle, the external force for extracting the detent 58 from the mounting hole 54 of the stopper part 40 is exerted on the stopper part 40 not as a force for lifting the stopper part 40 upward, but as the aforementioned external force applied to the direction in which a main load acts in the planar direction of the stopper main body 48 (left-right direction in FIG. 2). When the external force is applied, the detent 58 is going to slip out of the mounting hole 54 while being deformed and displaced in the prizing direction in which the detent 58 inclines. At that time, the portions that abut against and are effectively detained with the lower opening peripheral edge of the mounting hole 54 are, among the upper end faces of the detent 58, the left and right side opposite portions in FIG. 8 that are positioned in the direction in which a main load acts in the planar direction of the stopper main body 48. The upper and lower side opposite portions in FIG. 8 orthogonal thereto are located roughly on the center axis of tilt and contribute little to the detaining action.

With the rubber stopper 10 of the present practical embodiment, the notched parts 62 are provided on the upper and lower side opposite portions of the detent 58, which contribute little to the detaining action. This makes it possible to facilitate the insertion and assembly procedure of the mounting leg 52 to the mounting hole 54 owing to the notched part 62 as well as to minimize deterioration in the resistance to dislodgment owing to the detaining action by the detent 58 due to the provision of the notched part 62. Accordingly, the fixing strength of the rubber stopper 10 with respect to the stopper part 40 can be more efficiently obtained.

Figure 12:
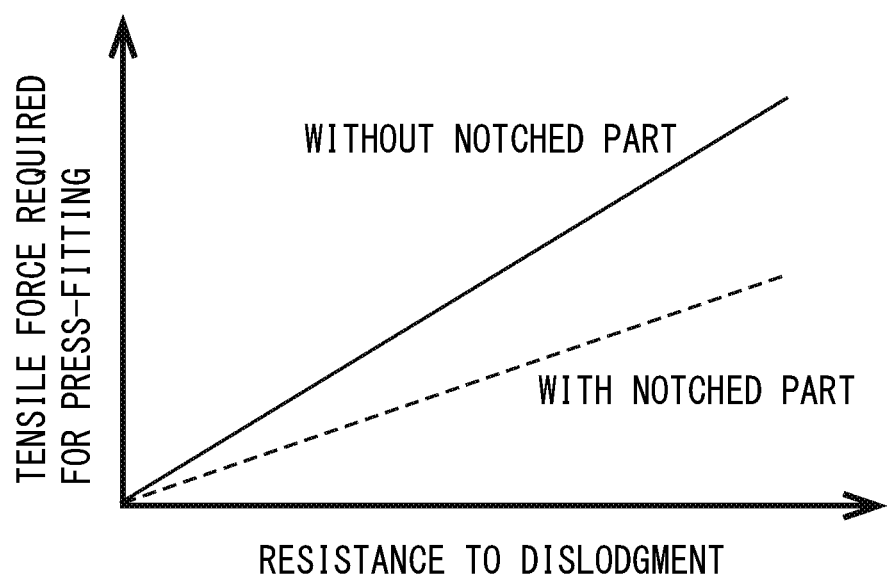
FIG. 12 is a graph suitable for explaining characteristics of the rubber stopper shown in FIG. 1.
Figure 13:
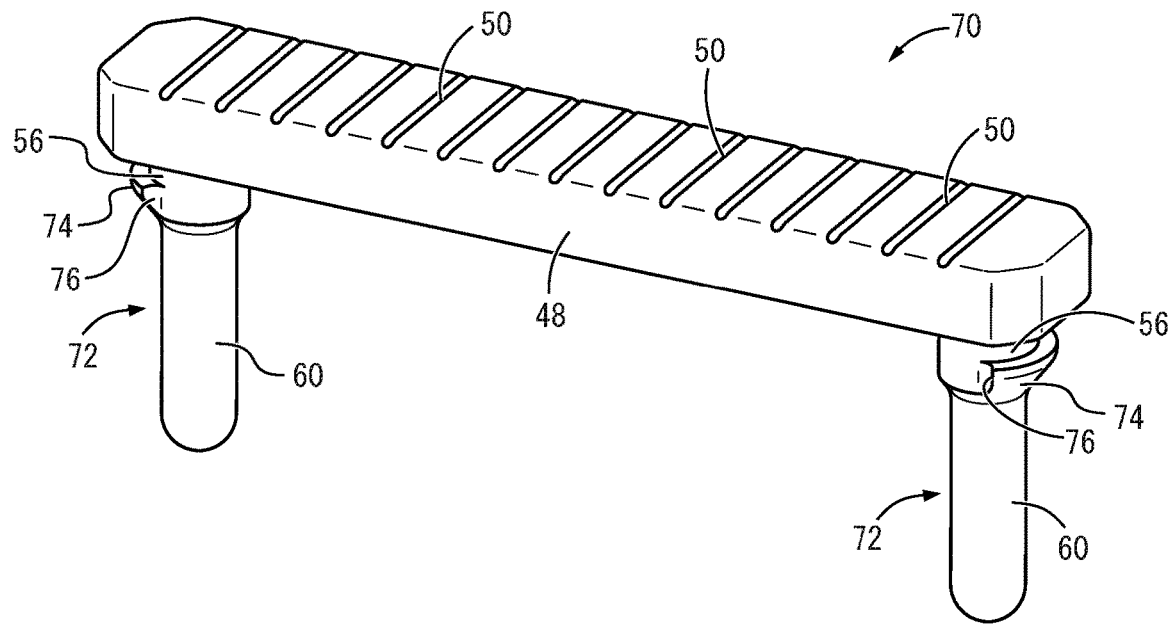
FIG. 13 is a perspective view of a rubber stopper according to a second practical embodiment of the present invention, corresponding to FIG. 5.
Figure 14:
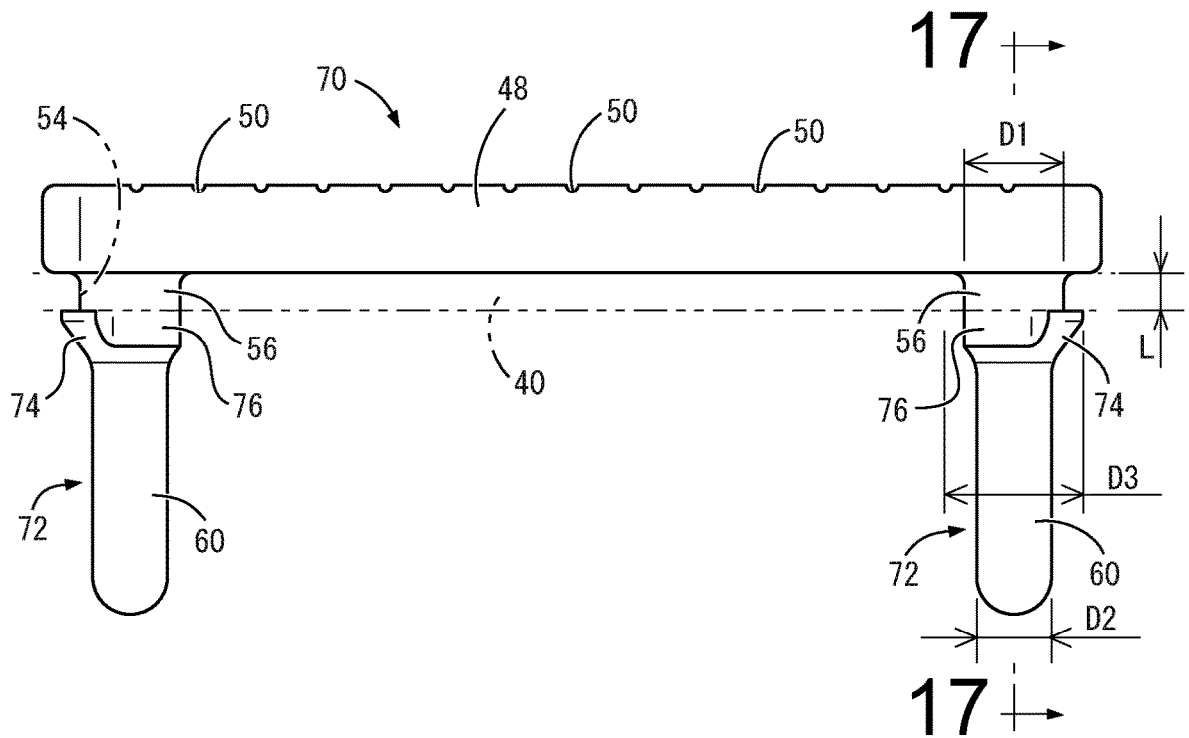
FIG. 14 is a front view of the rubber stopper shown in FIG. 13.
Figure 15:
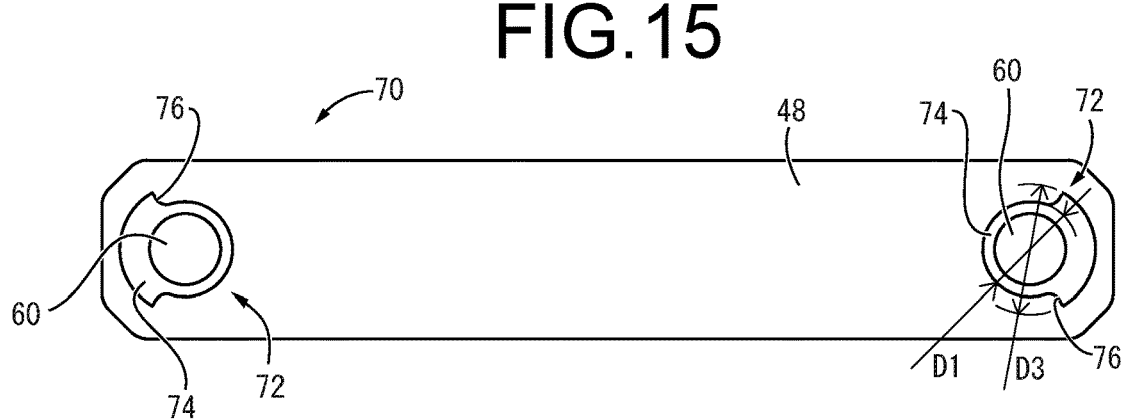
FIG. 15 is a bottom view of the rubber stopper shown in FIG. 13.
Figure 16:
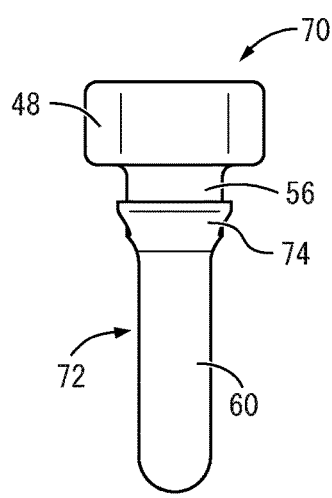
FIG. 16 is a side view of the rubber stopper shown in FIG. 13.
Figure 17:
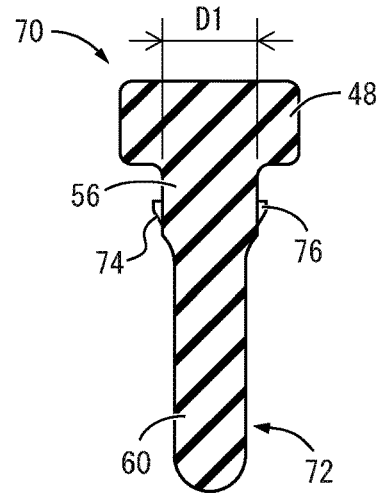
FIG. 17 is a cross sectional view taken along line 17-17 of FIG. 14.
Figure 18:
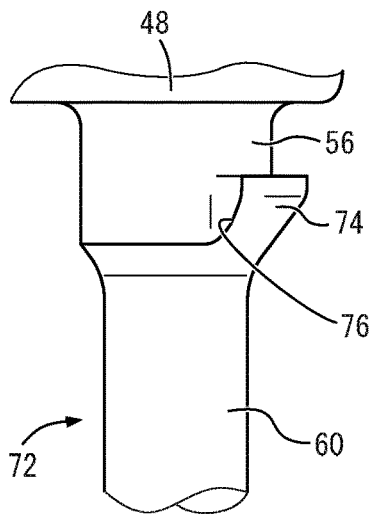
FIG. 18 is an enlarged view of a principal part of FIG. 14.

Incidentally, with respect to the mounting leg 52 having the structure according to the present practical embodiment including the notched part 62 provided to the detent 58, and with respect to a mounting leg having a structure of comparative example comprising a detent without a notched part, consideration results of each characteristic estimated by the inventors from the results of experiments and studies are shown by a graph in FIG. 12. In the graph, the vertical axis shows the tensile force applied to the protrusion required for attaching the mounting leg to the stopper part 40 by press-fitting the detent into the stopper part 40 having the identical mounting hole 54. The horizontal axis shows the resistance to dislodgment, which is the maximum force for preventing the mounting leg having the detent from becoming dislodged from the mounting hole 54 when an external force applied to the direction in which a main load acts in the planar direction of the stopper main body 48 (left-right direction in FIG. 2) is exerted on the rubber stopper in the mounted state to the stopper part 40. The outline characteristic as the result of consideration of the characteristics is represented by a straight line. As will be appreciated from the graph, for the detent with the notched part, the tensile force required for press-fitting the detent can be lowered in comparison with the detent without the notched part when an equal, constant resistance to dislodgment is imparted. Thus, the rubber stopper 10 according to the present practical embodiment makes it possible to achieve good assembly workability while obtaining sufficient fastening force of the rubber stopper 10 with respect to the stopper part 40.

The adjustment of the resistance to dislodgment can be achieved, for example, by increasing the outside diameter dimension of the large-diameter side of the detent 58 to enlarge the detaining surface with respect to the lower opening peripheral edge of the mounting hole 54, or by reducing the taper angle of the outer peripheral surface of the detent 58 to improve the rigidity in the axial direction, or the like. In addition, the inclination of the straight line graph representing the characteristics of the preferred embodiment having the notched part according to the present practical embodiment can be adjusted by changing the shape, size, and the like of the notched part 62.

Furthermore, in the rubber stopper 10 of the present practical embodiment, the notched part 62 is formed with a length that does not reach the lower end of the detent 58, and the notched part 62 is provided in the detent 58 not only partially in the circumferential direction but also partially in the axial direction. This configuration will more effectively prevent the resistance to dislodgment owing to the detaining action of the detent 58 with respect to the stopper part 40 from being excessively deteriorated by the notched part 62, thereby exhibiting more stable resistance to dislodgment.

Besides, in the rubber stopper 10 of the present practical embodiment, a plurality of the recessed grooves 50 extending in the width direction (vertical direction in FIG. 7) are formed on the upper surface of the stopper main body 48. Thus, the spring characteristics at the time of low load are softened, thereby improving the cushioning action at the initial stage of abutment in the stopper mechanism 14. In particular, in the present practical embodiment, the recessed grooves 50 extend in the direction generally orthogonal to the direction in which a main load acts in the planar direction of the stopper main body 48, which is the direction in which the external force for pulling out the mounting leg 52 from the mounting hole 54 acts. Therefore, the deformation rigidity of the stopper main body 48 in the left-right lengthwise directions is lowered by the plurality of recessed grooves 50, so as to reduce the external force transmitted to the mounting leg 52 from the portion where the load is input due to abutment of the first bracket 16 against the stopper main body 48. Thus, stability of the fixed state to the stopper part 40 by the mounting leg 52 may also be improved.

Next, FIGS. 13 to 18 depict a rubber stopper 70 as a second practical embodiment of the present invention. The rubber stopper 70 according to the present practical embodiment can be used by being mounted onto the vibration damping device 12 having the first and second brackets 16, 18 exemplified in the first practical embodiment, so that a detailed description of the mounted state will be omitted by referring to the first practical embodiment. In addition, the rubber stopper 70 of the present practical embodiment has the common basic structure as the rubber stopper 10 of the first practical embodiment, and exemplifies another preferred embodiment of the detent. In order to facilitate understanding, elements having the same structure as the rubber stopper 10 of the first practical embodiment are denoted by the same reference numerals as those of the first practical embodiment.

Specifically, the rubber stopper 70 according to the present practical embodiment includes a pair of projecting mounting legs 72, 72 that are positioned and opposed to each other on opposite sides in the lengthwise direction of the stopper main body 48, and the pair of mounting legs 72, 72 are provided with respective detents 74. There are formed notched parts 76, 76 on the respective inner sides of the detents 74 that are opposed to each other. That is, the notched parts 76, 76 of the detents 74, 74 are opened so as to be opposed to each other in the lengthwise direction of the stopper main body 48.

It should be appreciated that the shape, size and the like of the notched part 76 can be appropriately set according to the required detaining force to the stopper part 40 and the press-fitting force to the mounting hole 54. In the present practical embodiment, the notched part 76 has a wide groove shape extending in the axial direction of the detent 74 with a generally constant circumferential width dimension, which is the width dimension of at least ½ but not greater than ¾ of the circumference of the detent 74 in the circumferential direction. The depth dimension of the notched part 76 in the present practical embodiment is equal to the radial projecting height of the detent 74 from the outer peripheral surface of the neck 56 to the large-diameter side end of the detent 74, and the outer peripheral surface of the neck 56 extends in the axial direction with the same plane that is continuous with the bottom face of the notched part 76.

Furthermore, the outside diameter of the protrusion 60 is smaller than the outside diameter of the neck 56. Thus, the notched part 76 having the bottom face which is equal in radial position to the bottom face of the neck 56 extends downward from the upper end of the detent 74 to the medial portion thereof, similarly to the notched part 62 of the first practical embodiment, so that the axial length of the notched part 76 is smaller than the axial length of the detent 74.

In the rubber stopper 70 according to the present practical embodiment as described above, the notched part 76 that is larger than that of the first practical embodiment is provided in the detent 74 of the mounting leg 72. Besides, the abutting face of the large-diameter end face of the detent 74 of the mounting leg 72 against the stopper part 40 is substantially only the portion of approximately half a circumference or less located on the outer side in the lengthwise direction of the stopper main body 48.

Thus, with the rubber stopper 70 of the present practical embodiment, it is possible to more easily insert the detent 74 and hence the mounting leg 72 into the mounting hole 54 of the stopper part 40. On the other hand, the abutting face of the detent 74 against the stopper part 40 is smaller than that of the first practical embodiment. However, this abutting face is positioned at each outer side in the left-right direction in FIG. 15, which is the direction in which a main load acts in the planar direction of the stopper main body 48. Accordingly, it is possible to efficiently obtain the resistance to dislodgment with respect to the external force extracting the detent 74 from the mounting hole 54.

Therefore, according to the mounting leg 72 having the detent 74 provided with the notched part 76 of the present practical embodiment, it is possible to obtain sufficient fastening force owing to the detaining action of the detent 74 with respect to the stopper part 40 which is required for fixing the rubber stopper 70 to the stopper part 40, while further improving workability of attaching the rubber stopper 70 to the stopper part 40 by inserting the detent 74 into the mounting hole 54.

While the practical embodiments of the present invention have been described in detail above, the present invention shall not be construed as limited to the above-mentioned specific description. For example, the specific shapes and sizes of the notched parts 62, 76 provided to the detents 58, 74 can be appropriately changed in accordance with the required characteristics. Besides, it would also be possible to provide three or more notched parts in the circumferential direction of the detent, and when providing a plurality of notched parts, they can be made in mutually different shapes, sizes, or the like.

Specifically, in the above-described practical embodiments, the notched part is formed with a cross-sectional shape such as a V-letter shape gradually expanding in the circumferential direction toward the outer peripheral surface of the detent. However, for example, it would also be possible to adopt a notched part extending in the axial direction with a rectangular groove shape that opens onto the outer peripheral surface and has a generally constant circumferential width, or with a crescent-moon cross sectional shape formed by notching the outer peripheral portion of the detent in the chord direction.

In addition, the shapes of the detents 58, 74, the neck 56, the protrusion 60, etc. are not limited to the inverted frustoconical shape or the circular rod shape as illustrated. It would also be possible to adopt an appropriate outer peripheral surface shape such as a rectangle or an ellipse.

Furthermore, the position, size, number, and the like of the mounting legs 52, 72 formed on the stopper main body 48 are not limited in the present invention. For example, when the width dimension of the stopper main body 48 is large, it would also be possible to provide the mounting legs not only at the opposite end portions in the lengthwise direction as in the above practical embodiments but also at the end portions in the width direction or the like as needed. It would also be possible to provide a plurality of mounting legs at the opposite end portions in the lengthwise direction.

Moreover, it goes without saying that the specific shape, structure and the like of the vibration damping device, bracket and the like to which the rubber stopper according to the present invention is attached are not limited. For example, it would also be acceptable to omit the bracket and to provide the stopper part directly to the vibration damping device main body, the power unit side, the vehicle body side, or the like.

It is also to be understood that the present invention may be embodied with various changes, modifications and improvements which may occur to those skilled in the art, without departing from the spirit and scope of the invention.

What is claimed is:

1. A rubber stopper configured to be mounted onto a stopper part of a vibration damping device, the stopper part being adapted to limit an amount of deformation of the vibration damping device and having a mounting hole, the rubber stopper comprising:
    a stopper main body to be overlapped on an abutting face of the stopper part; and
    at least one mounting leg projecting from the stopper main body to a side of the abutting face of the stopper part, the mounting leg being configured to be inserted into the mounting hole of the stopper part, wherein
    the mounting leg includes a neck to be positioned within the mounting hole, a protrusion to pass through the mounting hole and project to be positioned on a side of a back surface of the stopper part, and a detent positioned between the neck and the protrusion, the detent having an outer peripheral surface enlarged from the protrusion toward the neck and being configured to be detained with the back surface of the stopper part, and
    the detent includes at least one notched part where an outside diameter of the detent is made small, the notched part being provided partially in a circumferential direction of the detent.

2. The rubber stopper according to claim 1, wherein a diameter dimension of a bottom part of the notched part of the detent is not smaller than a diameter dimension of the neck.

3. The rubber stopper according to claim 1, wherein in a lengthwise direction of the mounting leg, the notched part of the detent extends from a neck-side end face of the detent in the lengthwise direction of the mounting leg, and the notched part has a length that does not reach the protrusion.

4. The rubber stopper according to claim 1, wherein the notched part of the detent has a groove shape extending in a lengthwise direction of the mounting leg with a cross sectional shape expanding toward the outer peripheral surface of the detent.

5. The rubber stopper according to claim 1, wherein the notched part of the detent is provided such that the notched part is positioned on at least one of opposite sides in a direction orthogonal to a direction in which a main load acts in a planar direction of the stopper main body.

6. The rubber stopper according to claim 5, wherein the at least one notched part of the detent comprises a pair of notched parts, and the notched parts are positioned on the opposite sides in the direction orthogonal to the direction in which the main load acts in the planar direction of the stopper main body.

7. The rubber stopper according to claim 1, wherein
    the at least one mounting leg comprises a pair of mounting legs that are positioned and opposed to each other on opposite sides in a direction in which a main load acts in a planar direction of the stopper main body, and
    the detent of each mounting leg includes the notched part having a prescribed circumferential width on a corresponding one of inner sides of the mounting legs that are opposed to each other.

8. The rubber stopper according to claim 1, wherein the mounting leg is situated away from a position where the stopper main body is configured to be abutted by the vibration damping device.

9. The rubber stopper according to claim 1, wherein the stopper main body includes a plurality of recessed grooves on a surface thereof, the recessed grooves extending in a direction orthogonal to a direction in which a main load acts in a planar direction of the stopper main body.

* * * * *